Dec. 16, 1969   G. HUTTEL   3,483,626
DISTANCE MEASURING INSTRUMENT
Filed Aug. 16, 1968   2 Sheets-Sheet 1

INVENTOR
Gottfried Huttel
BY Krafft & Wells
ATTORNEYS

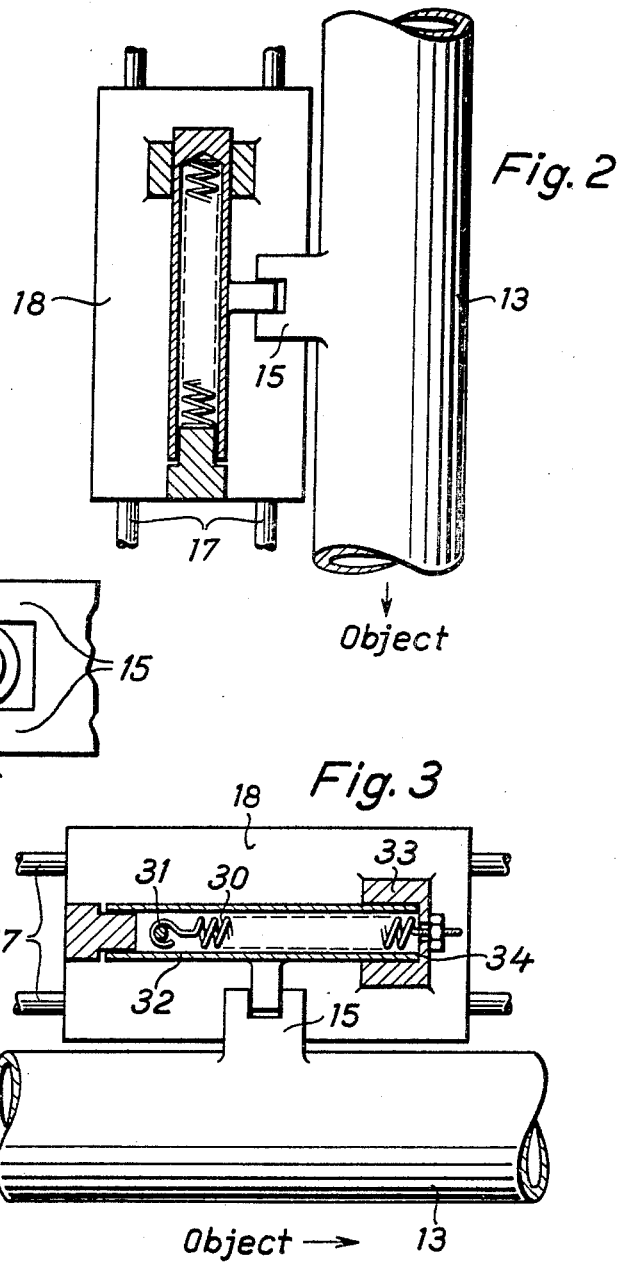

United States Patent Office 3,483,626
Patented Dec. 16, 1969

3,483,626
DISTANCE MEASURING INSTRUMENT
Gottfried Huttel, Wetzlar, Germany, assignor to Ernst
Leitz GmbH, Wetzlar, Germany
Filed Aug. 16, 1968, Ser. No. 753,234
Claims priority, application Germany, Aug. 24, 1967,
L 57,286
Int. Cl. G01b 5/14
U.S. Cl. 33—143     5 Claims

ABSTRACT OF THE DISCLOSURE

In a distance measuring device a measuring sleeve is provided which is guided between ball bearings so as to be movable in the direction towards a workpiece and away from it. A motor-driven carriage is displaceable in a direction parallel to the sleeve, and spring means are suspended between the carriage and the sleeve, thus keeping these elements in an abutting engagement and causing them to move as a unit. The resilient force of the spring, however, allows for a small displacement of the sleeve relative to the carriage when the sleeve engages the workpiece, but which displacement a circuit breaker in the circuit of the motor is opened.

BACKGROUND OF THE INVENTION

Field of the invention

The present invention relates to distance measuring instruments. More particularly, the invention relates to measuring instruments having a measuring sleeve which is moved from a zero position into engagement with a workpiece.

Description of the prior art

With distance measuring instruments of the above-mentioned type it is common practice to compensate for the weight of the measuring sleeve by a counterweight which may be moved manually or by a motor, as described in the laid-open German patent application DAS 1,237,-334. By this movement the sleeve is brought into contact with the workpiece to be measured and is thereafter withdrawn therefrom. The measuring range of these devices averages about 3.9 inches or 100 millimeters. In order to enlarge this average measuring range it is known to mount the sleeve and the counterweight as a unit in sliding bearings on a stand. By displacing the housing wherein the sleeve and the counterweight are mounted along the sliding bearings, the measuring range can be adjusted to the size of the workpiece. It is a disadvantage, however, that by positively securing the housing to the stand after displacement along the bearings, for example by means of screws, this securing may cause a certain stress in the material of the stand. The latter may thus become slightly distorted, which distortion, of course, will be only very minute. Considering, however, that with these devices distances of as little as 0.0000394 inch or 1/1000 of one millimeter are to be measured, it will be understood that not even the slightest distortion can be tolerated. Moreover, the sleeve housing has to be re-adjusted after every displacement in the sliding bearings along the stand. The instrument can thus not readily be used for alternate measurements of workpieces that differ extensively in size. With one particular type of these measuring devices which is used in industry, the danger of causing a stress in the stand material is avoided by designing the sleeve housing and the stand as a unit without the possibility of adjusting the position of the housing relative to the stand. As a result, the measuring range of this device is rather small so that the device's range of application is also rather limited.

Further, it has proven to be of a disadvantage that the balance of the weight of the sleeve in all known measuring instruments of this kind depends on a counterweight. This means that, for obvious reasons, the instrument can only be used for measuring distances in a vertical direction but not in a horizontal direction.

It is, therefore, an object of the invention to provide a distance measuring device which has the housing of the measuring sleeve rigidly secured to the instrument stand.

Another object of the invention is to provide a distance measuring instrument which has a rigidly secured sleeve housing and yet is capable of performing measurements within a relatively great range.

It is a further object to provide a distance measuring device which can be used for measuring in a horizontal as well as in a vertical direction.

SUMMARY OF THE INVENTION

According to the invention, these objects are attained by arranging a carriage in the housing of the measuring sleeve which carriage is slidable on a bearing in parallel to the direction of movement of the sleeve. Sleeve and carriage are mechanically connected by a spring means by which, upon engagement of the sleeve with the workpiece, the pressure against the workpiece is defined.

An electric motor is provided by which the carriage is displaced in the direction of movement of the sleeve, and by means of the spring the sleeve is urged to move in the same direction as the carriage. A circuit breaker is mounted on the carriage so as to be operable by the spring means or the elements connected with said means, which circuit breaker is part of the motor circuit. If, upon engagement of the sleeve with the workpiece, the sleeve is blocked from further movement the carriage will still be moved, however, after a small displacement the spring means will operate the circuit breaker, thus bringing the motor to a standstill.

In order to provide a greater measuring range than have the prior art devices the base of the stand has an opening. A measuring table can be mounted on the base, which table consists of a cylinder having a shoulder on one side. The table can be mounted with the cylinder portion standing upright or with said portion being sunk into the opening. The measuring range is thus defined by the height of the measuring table over the base of the stand with the greatest range being available when the cylindrical portion is inserted in the opening.

DESCRIPTION OF THE DRAWINGS

The invention will be more readily comprehended from the following description when taken in conjunction with the appending drawings, wherein:

FIG. 2 is a partial view of the carriage and the sleeve interconnected by a spring means as is suitable for vertical measurement, FIG. 3 is a partial view of the carriage and the sleeve interconnected by a spring means as is suitable for horizontal measurement, and FIG. 4 is an enlarged partial view of the carriage showing the spring means in operative connection with the circuit breaker.

DESCRIPTION OF THE PREFERRED EMBODIMENTS

Figure 1:
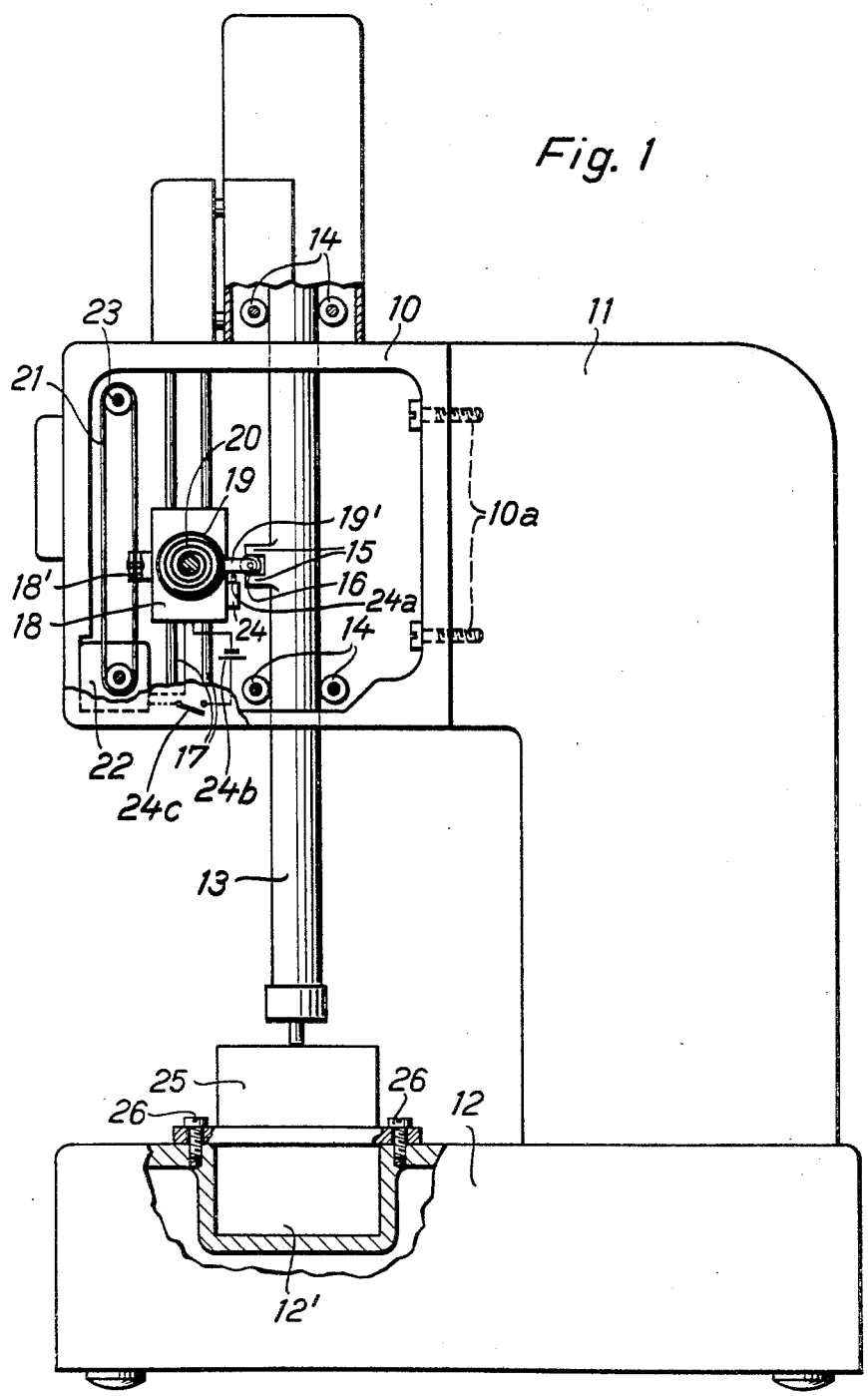
FIG. 1 is a schematical side elevational view of the measuring device with the side wall of the sleeve housing removed.

The instrument depicted in FIG. 1 consists basically of the base plate 12 and the stand 11 to which the sleeve housing 10 is fastened by means of the screws 10a. Within the housing 10 the sleeve 13 is journaled in the ball bearings 14 so as to be movable in a vertical direction. Two studs 15 project from one side of sleeve 13 and form a recess between them wherein a ball bearing 16 is guided.

In parallel to the direction of movement of sleeve 13 there are arranged in the housing 10 two guide rods 17 on which a carriage 18 is displaceable. A cage 19 is pivotably secured to the carriage 18, which cage has an arm 19' that carries at its end the ball bearing 16. A spiral spring 20 is fastened with its inner end to the stationary axle that is part of carriage 18 and with its outer end to the wall of cage 19. By this spring 20 the cage 19 is preloaded relative to the carriage 18 with the pre-load being set to a value which compensates for the weight of sleeve 13 to such an extent that only the required force of impact of the measuring sleeve 13 on the workpiece remains effective. By suitable means (not shown), for example by designing the stationary axle so as to be turnable and settable relative to carriage 18, the spring tension may be made adjustable to various values. Thus the force of impact may be regulated within a certain range and may be set exactly to the required value.

The carriage 18 is provided with a projecting portion 18' by means of which it is connected to an endless belt 21. The latter is driven by a pulley on the power take-off axle of a reducing gear in gear box 22 and is further suspended on a return pulley 23. A circuit breaker 24 is disposed inside the carriage 18 with an operating pin 24a extending through the wall in the carriage, which pin is in abutting engagement with arm 19'. The circuit breaker 24 is thus made operable by arm 19' and will be switched whenever cage 19 pivots relative to carriage 18. Circuit breaker 24 is in series connection with the battery 24b and an electric motor that is enclosed in gear box 22. FIG. 4 shows the circuit breaker and the operating pin 24a in greater detail.

The above described device functions as follows: First be it assumed that the measuring sleeve 13 occupies its topmost position. If now the switch 24c is closed the motor in gear box 22 will begin to run as a consequence whereof belt 21 moves carriage 18 downwards. The movement of carriage 18, of course, causes also sleeve 13 to move likewise since the latter is operatively connected to carriage 18 by arm 19', spring 20 and cage 19. When sleeve 13 engages the workpiece the downward movement of sleeve 13 is blocked, however, carriage 18 is still left free to continue its vertical displacement. Carriage 18 thus proceeds in this direction until very shortly afterwards the pivoting cage 19 with arm 19' has given enough room for pin 24a to be lifted by the resilient force of the one blade of circuit breaker 24 with which it is in contact. Thereby the circuit breaker 24 is opened and, as a consequence thereof, the current supply for the driving motor is cut off: the motor comes to a sudden standstill. The reading of the measurement value is done off a scale (not shown) in conventional manner.

Thereafter, the motor is switched on to run in reverse direction so that the measuring sleeve is again lifted from the workpiece. This upward movement can be performed at a speed higher than the downward motion and can be carried on until the current circuit is opened manually, or until the sleeve itself engages in its topmost position a contact which it opens. The wiring diagram required for these operations is purely conventional and can readily be designed by anyone skilled in this particular art. Therefore, the diagram has been omitted in the drawings for sake of simplicity.

Although an instrument as described above already provides an enlarged measuring range it may be advantageous to extend this range still further. To this end, the base plate 12 is provided with an opening 12' which is covered by an object table 25. The latter is a cylinder the axis of which extends in parallel to the sleeve axis or coincides therewith. One end of the table 25 has a shoulder with holes in it through which screws 26 are threaded into the base plate 12. The table 25 can be mounted in two ways: first in such a way that the cylinder extends towards the sleeve, and secondly, in an upside-down position in which the cylinder is sunk in the opening 12'. From each way of mounting results a different measuring range.

It is a particular advantage of the new device that the same type of sleeve housing 10, after a change of the direction of spring tension and thrust can be employed for measurements in a horizontal direction. This change can, for example, be accomplished by interchanging the springs. The required different springs may even be provided altogether at the carirage in such a way that they can alternately be brought into effect. The change-over from one type of spring to the other can, for example, be performed by means of electric relays.

Instead of the spiral spring 20 as shown in FIGS. 1 and 4, other types of springs may be used. Such springs could, for example, be of the well known cup spring type or of the helical spring type as illustrated in the FIGS. 2 and 3. FIG. 2 shows a spring arrangement for measurements in a vertical direction, while FIG. 3 shows a spring arrangement for measurements in a horizontal direction.

In FIG. 3 are, by way of example, also illustrated the means for adjusting the spring tension. One end of the helical spring 30 is fixed by a pin 31 inside a cartridge 32. The other end extends through a hole in a portion 33 of the carriage. This spring end is threaded and carries a nut. The cartridge abuts against a shoulder of a guiding portion 34 which is an integral part of the carriage. By turning the nut one way or the other the spring tension can be increased or lessened.

What is claimed is:

1. A device for alternatively measuring distances in a horizontal or a vertical direction, said device comprising in combination:
    a base plate, a stand and a sleeve housing,
    a displaceable measuring sleeve, said sleeve being guided inside said sleeve housing and extending at least with one end through the housing wall in the direction of the base plate,
    a displaceable carriage within said sleeve housing, said carriage being guided in a direction parallel to the direction of movement of said measuring sleeve,
    spring means being suspended between said carriage and said measuring sleeve, said spring means being adapted to combine said carriage and said measuring sleeve to a joint movement when said carriage is displaced,
    an electric motor and a power source for said motor,
    gear means adapted to operatively connect said motor and said carriage so as to displace said carriage when said motor is running, and
    a circuit breaker in the circuit of said motor, said circuit breaker being arranged so as to be opened when, upon joint movement of said sleeve and said carriage, said sleeve engages the workpiece to be measured while said carriage continues its movement.

2. A device for alternatively measuring distances in a horizontal or a vertical direction according to claim 1, and further comprising means for adjusting the tension of said spring means.

3. A device for alternatively measuring distances in a horizontal or a vertical direction according to claim 1, and further comprising a measuring table being mounted on said base plate.

4. A device for alternatively measuring distances in a horizontal or a vertical direction according to claim 3, wherein said measuring table is cylinder-shaped and is mounted on said base plate with its axis extending in parallel with the axis of the measuring sleeve.

5. A device for alternatively measuring distances in a horizontal or a vertical direction according to claim 1, wherein said base plate is provided with an opening adapted to receive the cylinder-shaped measuring table when it is mounted in an upside-down position.

References Cited

UNITED STATES PATENTS

| | | | |
|---|---|---|---|
| 2,697,879 | 12/1954 | Tandler et al. | 33—174 |
| 3,289,310 | 12/1966 | Stone | 33—170 |

LEONARD FORMAN, Primary Examiner

CHARLES E. PHILLIPS, Assistant Examiner

U.S. Cl. X.R.

33—147, 172